United States Patent [19]
Atsumi

[11] Patent Number: 5,407,331
[45] Date of Patent: Apr. 18, 1995

[54] MOTOR-DRIVEN PUMP

[75] Inventor: Masahiro Atsumi, Nagoya, Japan

[73] Assignee: Mitsubishi Jukogyo Kabushiki Kaisha, Tokyo, Japan

[21] Appl. No.: 3,612

[22] Filed: Jan. 13, 1993

[30] Foreign Application Priority Data

Jan. 14, 1992 [JP] Japan .................. 4-004741
Mar. 24, 1992 [JP] Japan .................. 4-065921
Mar. 24, 1992 [JP] Japan .................. 4-065922

[51] Int. Cl.⁶ .......................................... F04B 17/03
[52] U.S. Cl. .................... 417/420; 417/423.12
[58] Field of Search ........... 417/410, 423.7, 423.8, 417/423.16, 423.13, 366, 420; 415/111, 112, 173.6, 173.4

[56] References Cited

U.S. PATENT DOCUMENTS

| | | | |
|---|---|---|---|
| 2,109,679 | 3/1938 | Neveling | 415/111 |
| 2,782,721 | 2/1957 | White | 417/423.7 |
| 2,847,936 | 8/1958 | Richter | 417/420 |
| 3,364,866 | 1/1968 | Sato | 417/723.13 |
| 3,512,788 | 5/1970 | Kilbane | 415/173.6 |
| 3,513,942 | 5/1970 | Sato | 417/423.13 |
| 3,826,938 | 7/1974 | Filer | 417/420 |
| 3,932,069 | 1/1976 | Giardini et al. | 417/420 |
| 4,644,202 | 2/1987 | Kroy et al. | 310/58 |
| 4,806,080 | 2/1989 | Mizobuchi et al. | 417/423.12 |
| 5,163,812 | 11/1992 | Klaus | 415/111 |
| 5,219,276 | 6/1993 | Metzner et al. | 417/423.7 |
| 5,248,245 | 9/1993 | Behnke et al. | 417/316 |

FOREIGN PATENT DOCUMENTS

| | | |
|---|---|---|
| 1038641 | 9/1958 | Germany . |
| 2012560 | 9/1971 | Germany . |
| 1185300 | 3/1970 | United Kingdom . |

Primary Examiner—Richard A. Bertsch
Assistant Examiner—Peter Korytnyk
Attorney, Agent, or Firm—Wenderoth, Lind & Ponack

[57] ABSTRACT

An integrated motor-driven pump includes an electromagnet disposed in the pump casing opposite a magnet mounted to an impeller of the pump. The impeller is rotatably supported within the casing, and is rotated by inducing a repulsion force in the magnet. In addition, a bearing rotatably supporting the impeller is provided in a portion of the casing formed with a flow passageway which leads working fluid handled by the pump flow to both sides of the bearing so that the bearing can be lubricated and cooled by the working fluid.

14 Claims, 9 Drawing Sheets

FIG. 2(a)
FIG. 2(b)
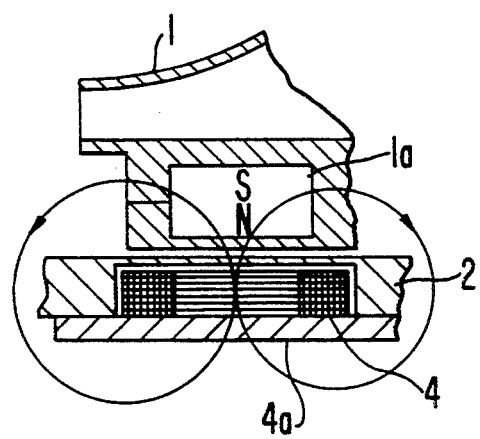
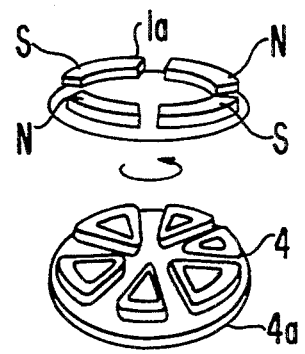
FIG. 2(c)
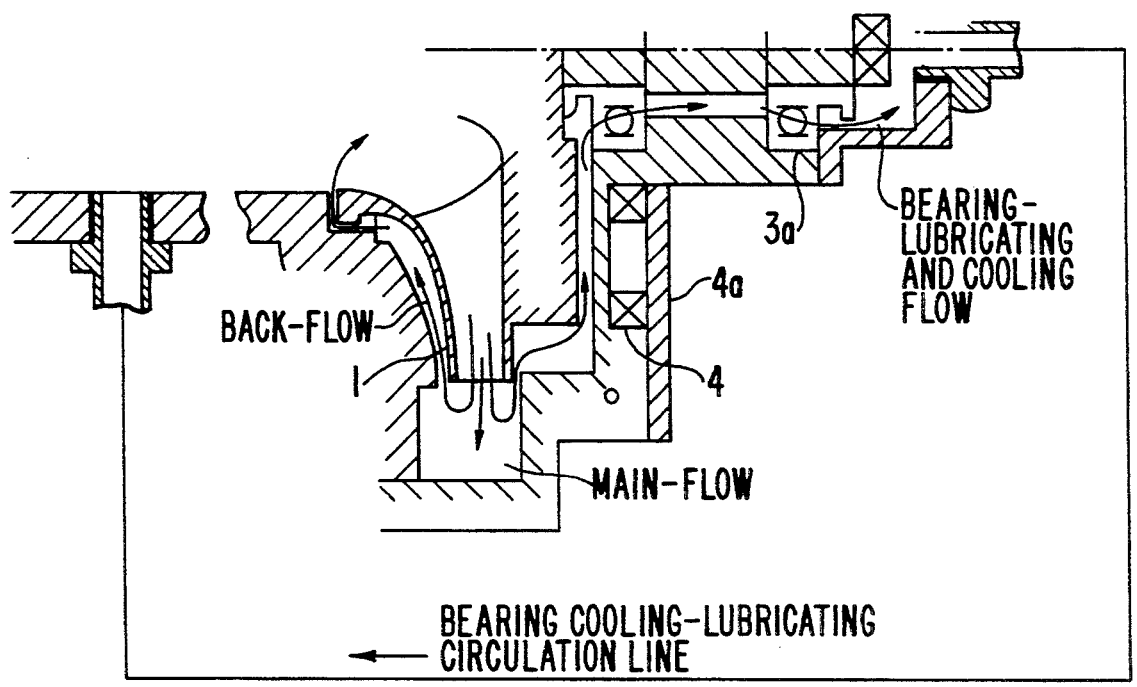

COOLING OF STATOR & ROTOR BY BACK-FLOW

MOTOR-DRIVEN PUMP

BACKGROUND OF THE INVENTION

1. Field of the Invention

The present invention relates to a motor-driven pump applicable as a booster of combustible fluid such as liquid fuel in a rocket, and low-temperature or very-low-temperature fluid such as liquid oxygen or liquid helium.

2. Description of the Prior Art

One example of a heretofore known motor-driven pump is shown in FIG. 9. The heretofore known pump is operated with its rotary shaft 03 directly connected to a power source such as an electric motor or a turbine to be driven. In order to prevent fluid from flowing from the inside of the pump to the outside thereof or into an electric motor, the shaft is sealed by a packing 04. Reference numeral 05 designates a rotor of the electric motor, numeral 06 designates a stator, numeral 07 designates a bearing, and numeral 08 designates a packing gland.

As described above, the shaft of the pump in the prior art is sealed by packing 04 so that fluid will not flow from the inside of the pump to the outside or into an electric motor. Therefore, power loss and abrasion are caused by relative sliding movement between the rotary shaft 03 and the packing 04. Also, it is difficult to perfectly prevent fluid from leaking from the pump, and hence, combustible fluid could ignite or low-temperature and very-low-temperature fluid could freeze if leaked from the pump.

SUMMARY OF THE INVENTION

It is therefore one object of the present invention to provide an improved motor-driven pump, in which combustible fluid handled by the pump will not leak and a driving electromagnet and a bearing are kept well cooled, whereby ignition or freezing of the fluid will not occur.

Another object of the present invention is to provide an improved motor-driven pump which can operate at high efficiency without encountering any problems in a bearing portion thereof even if very-low-temperature fluid is handled by the pump.

Still another object of the present invention is to provide an improved motor-driven pump constructed in such manner that clearance between a casing and an impeller of the pump is minimized.

In order to achieve the aforementioned objects, a motor-driven pump according to the present invention comprises a casing, an impeller accommodated within the casing, a bearing adapted to be cooled and lubricated by working fluid and rotatably supporting the same impeller, one of permanent magnets and induction coils provided in the impeller, and electromagnets provided in the casing.

In the motor-driven pump according to the present invention, the impeller is rotated by generating a repulsive force in the permanent magnets or induction coils provided in the impeller by means of the electromagnet. That is, the magnets or induction coils rotate according to the same principle as a brushless electric motor and directly drive the impeller to achieve a pumping operation. Therefore, a rotary shaft integral with the impeller need not project outside of the casing, and so a shaft seal is unnecessary.

In addition, in the motor-driven pump according to the present invention, since the bearing is cooled and lubricated by working fluid such as, for example, very-low-temperature fluid, metallic ignition can be prevented even if combustible working fluid is handled.

A flow passageway could be provided to lead the working fluid to both sides of balls of the bearing. Also, it is preferable to provide the bearing with a retainer of a self-lubricating material, such as tetra-fluoro-ethylene, so that the bearing can operate even if working fluid at a very low temperature flows to the bearing.

Furthermore, according to the present invention, the efficiency of the pump is enhanced by reducing the clearance between the impeller and the casing with an inducer liner ring provided on the outer circumference of the impeller. The efficiency may also be enhanced by providing an iron core in an electromagnet disposed in the casing.

The above-mentioned and other objects, features and advantages of the present invention will become more apparent by referring to the following description of a number of preferred embodiments of the present invention made in conjunction with the accompanying drawings.

BRIEF DESCRIPTION OF THE DRAWINGS

In the accompanying drawings

FIG. 2(a) is an enlarged view of a portion of a permanent magnet mounted to an impeller and an electromagnet mounted to a casing;

FIG. 2(b) is a general perspective view of the same permanent magnets and electromagnets;

FIG. 2(c) is an enlarged cross-sectional view of a portion of the pump including a flow passageway leading working fluid to a bearing supporting a rotary shaft;

DETAILED DESCRIPTION OF THE PREFERRED EMBODIMENTS

Figure 1:
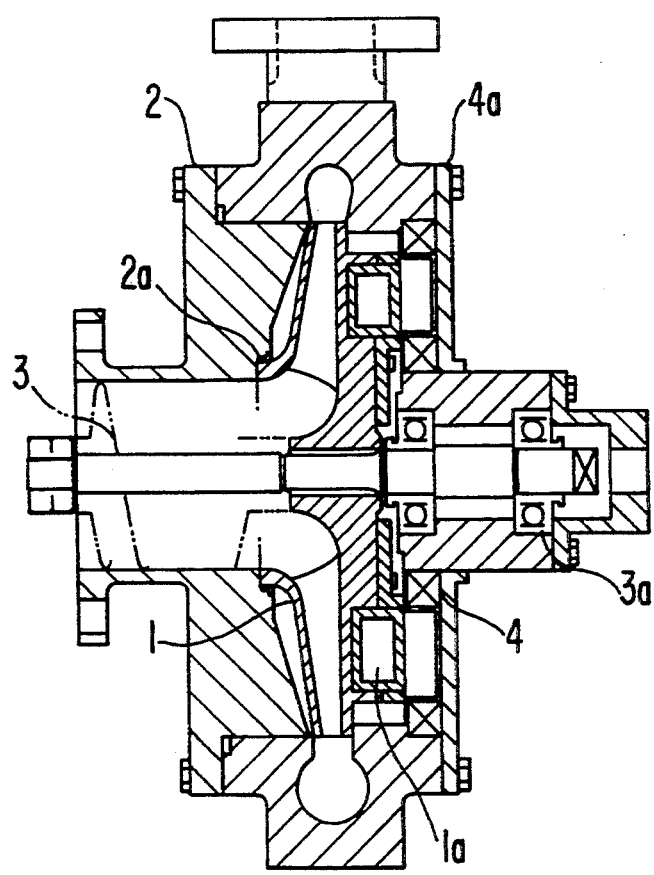
FIG. 1 is a cross-sectional view of a first preferred embodiment of a motor-driven pump according to the present invention.

The first preferred embodiment of the motor-driven pump according to the present invention shown in FIGS. 1 and 2 is used as a booster of liquid fuel in a rocket, and includes a centrifugal type impeller 1, and a rotary shaft 3 rotatably supported via a bearing 3a within a casing 2. In the back of this impeller 1 are embedded four magnets 1a of a brushless electric motor so as to be integrated with the impeller 1. Also, six electromagnets 4 for driving the magnets 1a are provided in the casing 2 opposite the magnets 1a. These electromagnets 4a are locked in position by a back yoke 4a of the casing 2. By sealing the portion of lead wires of the electromagnets 4 being led out through the casing 2, the inside and the outside of the casing 2 are perfectly isolated from one another, i.e. fluid cannot leak from the inside of the casing 2.

FIG. 2(a) shows a portion of the pump including a magnet 1a and electromagnet 4, and FIG. 2(b) shows only the magnets 1a and the electromagnets 4 in perspective. The driving electromagnets 4 are cooled via the casing 2. In addition, as best shown in FIG. 2(c), the bearing 3a is lubricated and cooled by internally circulating working fluid, for instance, the very-low-temperature liquid fuel itself. As a result, even in the case where liquid oxygen is employed as a working fluid, metallic ignition can be prevented. It is to be noted that although not shown in the figures, a ring-shaped retainer made of tetra-fluoro-ethylene having a self-lubricating property, fully effective even at a very low temperature, is used to maintain the spacing between the balls of the bearing 3a.

When a magnetic field is generated by the driving electromagnets 4 and the back yoke 4a, a repulsive force is generated in the magnets 1a by this magnetic field. Hence the impeller 1 rotates according to the same principle as a brushless electric motor, and a pumping action is effected. Since the illustrated motor-driven pump is designed especially to handle liquid fuel at a very low temperature, the electromagnets 4 are made by micro-grinding and sintering a rare earth alloy such as samarium cobalt ($Sm_2Co_{17}$), which has a low Curie point and can exhibit a good magnetic characteristic even at a low temperature. Such magnets are durable against thermal shock and contribute to high efficiency in the power output of the pump.

It is to be noted that a sensor such as a magneto-resistive transducer could be used for detecting the relative position of the magnets 1a, although the number of components of the pump would be fewer and the detection would be reliable if the driving electromagnet 4 were used as the position detector for the magnets 1a.

In addition, although the controller for controlling the motor is not illustrated in FIGS. 1 and 2, in the event that the motor-driven pump is used under a low-temperature or very-low-temperature condition, it is preferable to dispose the controller at a location held at a normal temperature.

Figure 3:
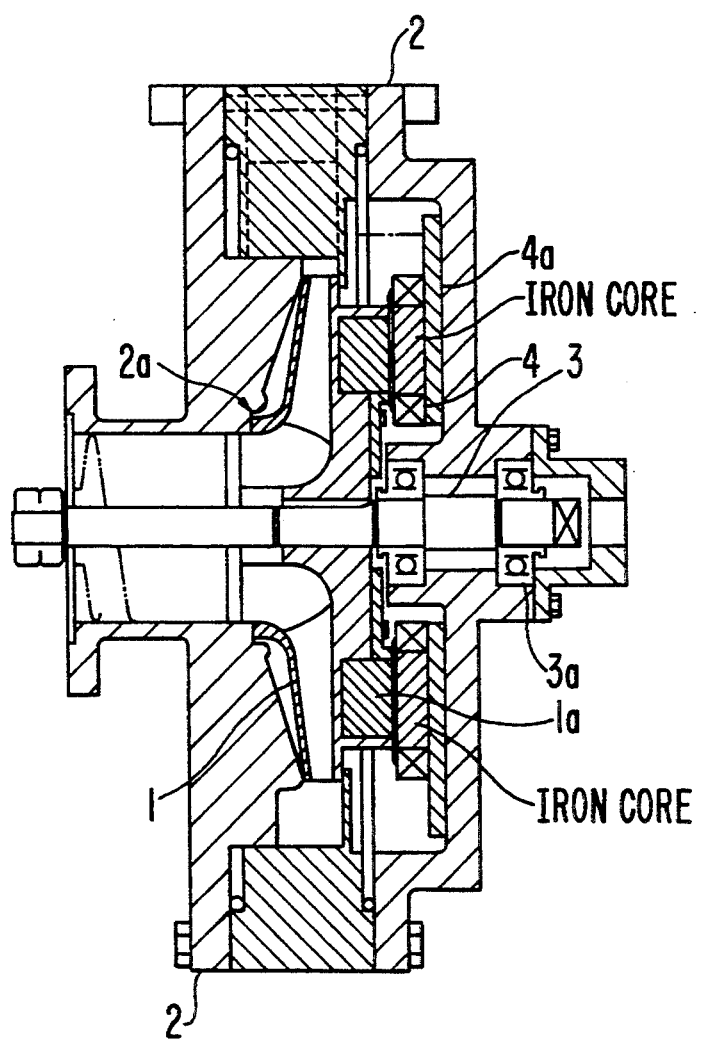
FIG. 3 is a cross-sectional view of a second preferred embodiment of a motor-driven pump according to the present invention.

It is to be noted that a higher torque can be generated by providing iron cores within the driving electromagnets 4, whereby the gaps between the electromagnets 4 and the magnets 1a would be small as seen in the second preferred embodiment shown in FIG. 3.

Figure 4A:
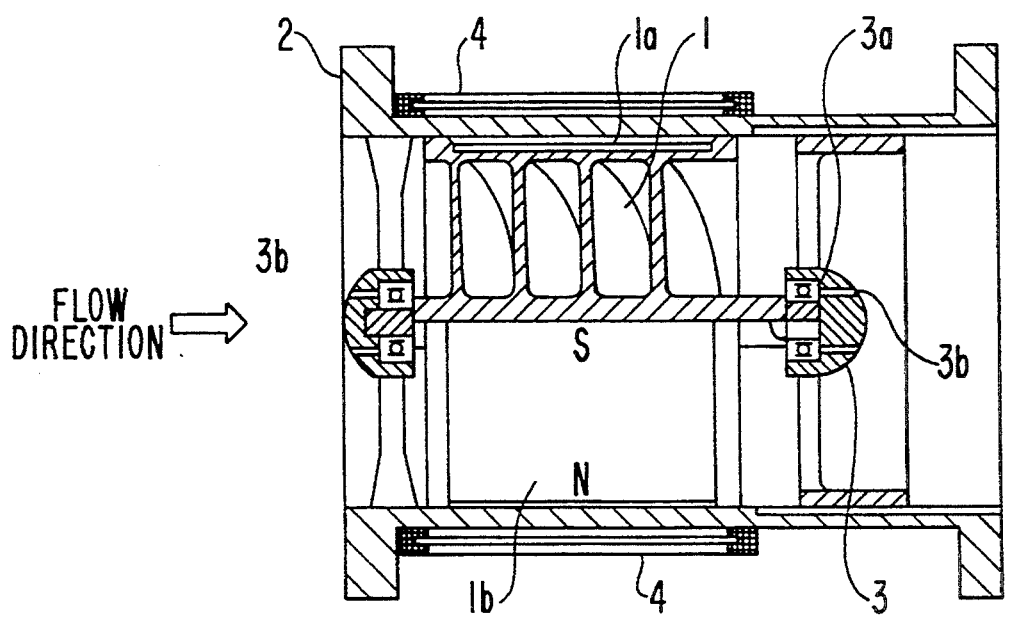
FIG. 4 shows a third preferred embodiment of a motor-driven pump according to the present invention, FIG. 4(a) being a general cross-sectional view thereof, and FIG. 4(b) being a cross-sectional view of a portion thereof showing the relative position of a casing and an impeller.
Figure 4B:
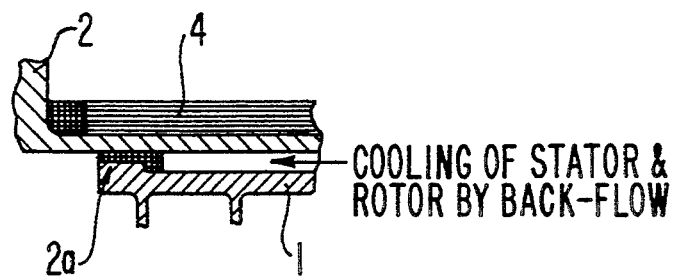

Furthermore, as seen in the third preferred embodiment of the present invention shown in FIG. 4, the present invention could be applied to a motor-driven pump having an axial flow type of impeller 1. In this case, an inner-rotor type of impeller 7 is surrounded by a cylindrical magnet 1a, and driven by a driving electromagnet 4 mounted to the outer periphery of the casing 2. This embodiment is especially suitable when the fluid must be prevented from leaking to the outside of the casing 2, and the pump is to be operated at a high speed for delivering the fluid at a high flow rate and under a low delivery pressure.

Figure 5A:
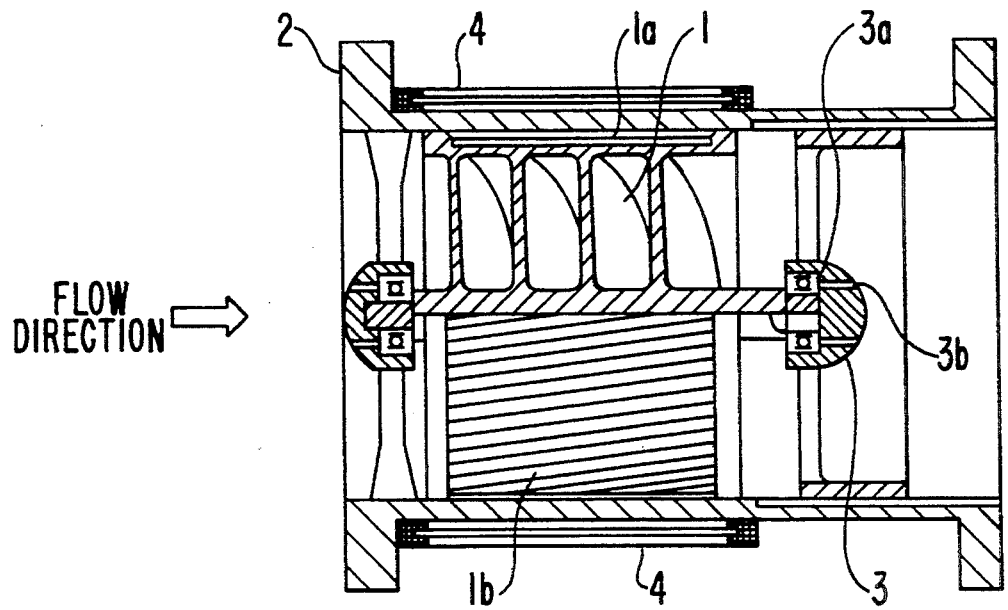
FIG. 5 shows a fourth preferred embodiment of a motor-driven pump according to the present invention, FIG. 5(a) being a general cross-sectional view thereof, FIG. 5(b) being a cross-sectional view of a bearing portion thereof, and FIG. 5(c) being a cross-sectional view of a portion thereof showing the relative position of a casing and an impeller.
Figure 5B:
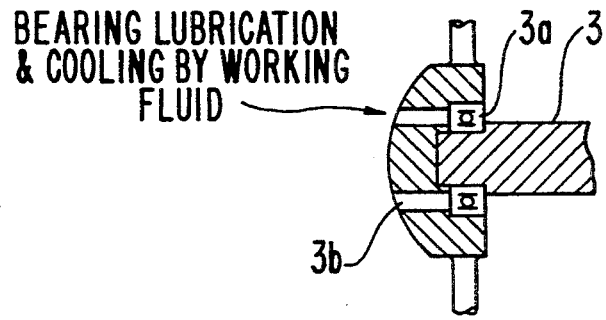
Figure 5C:
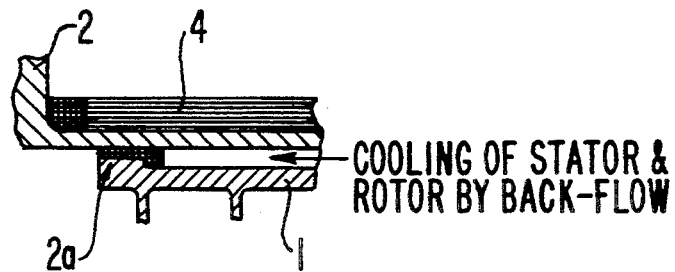

Next, the fourth preferred embodiment shown in FIG. 5 is similar to the above-described embodiment shown in FIG. 4 in that the electromagnet 4 serving as a stator for driving a rotor 1b is mounted to the outside of a casing 2. A labyrinth type of inducer liner ring 2a for reducing back flow is mounted to the rotor 1b. It is to be noted that the liner ring 2a could be manufactured with the rotor 1b. The electromagnet 4 is cooled by the back flow via the casing 2. Also, the bearing 3a is lubricated and cooled by the working fluid so that it can prevent metallic ignition within liquid oxygen. It is to be noted that the rotor 1b could be integrally mounted to the outer circumference of an inducer (not shown) instead of being mounted to the impeller 1. When a magnetic field is generated by the electromagnet 4, a repulsive force is produced in the rotor 1b by this magnetic field, and the rotor 1b rotates according to the same principle as an induction motor. The impeller 1 also rotates jointly with the rotor 1b and a pumping action is effected.

As described above, in the illustrated motor-driven pump, the impeller 1 rotates within the casing 2 as directly driven by the rotor 1b, and it is unnecessary to seal a shaft because the electric motor is integrated with the pump. In addition, owing to the fact that the rotary shaft is comparatively short, tolerances associated with the concentricity and dimensions of the rotary shaft 3, casing 2 and bearing 3a are not severe. Also, a special adjustment jig is unnecessary.

Since there is no location where there is a relative sliding of the shaft to a seal, there will be no leaking of combustible or dangerous fluid such as hydrazines, hydrogen or the like, or of fluid in the case where the pump is used in a vacuum such as in a space station. In addition, especially in the case of very-low-temperature combustible fluid or the like, purging is unnecessary. In addition, because the rotary shaft 3 is integrated with the impeller 1 and the rotor 1b to constitute a rotor assembly, vibrations normally caused by eccentricity can be suppressed. Also, even when the pump is used in a vacuum, it is not necessary to cool the electric motor. Moreover, the weight of the pump can be about 50–70% less than that in the prior art. Also, the mechanical loss is small, and the useful life of the pump is long. This pump can be used to pump very-low-temperature liquid, such as liquid hydrogen, liquid oxygen, liquid nitrogen, etc., to cool a superconductive coil, whereby the conductivity of the coil increases.

The boiling points of these very-low-temperature liquids are $-252.8°$ C. $-183.0°$ C., and $-195.8°$ C., respectively, and if an oxide super-conducting material having a critical temperature equal to or higher than these boiler points is used for the coil, it can serve as the rotor. Furthermore, the pump can be used in a vacuum into which fluid should never be admitted. Accordingly, the illustrated motor-driven pump can be used for pumping very-low-temperature fluid, non-magnetic fluid, combustible fluid and the like such as liquid hydrogen, liquid oxygen, liquid nitrogen, liquid helium, etc., in addition to being useful as a booster of liquid fuel in a rocket.

Figure 6A:
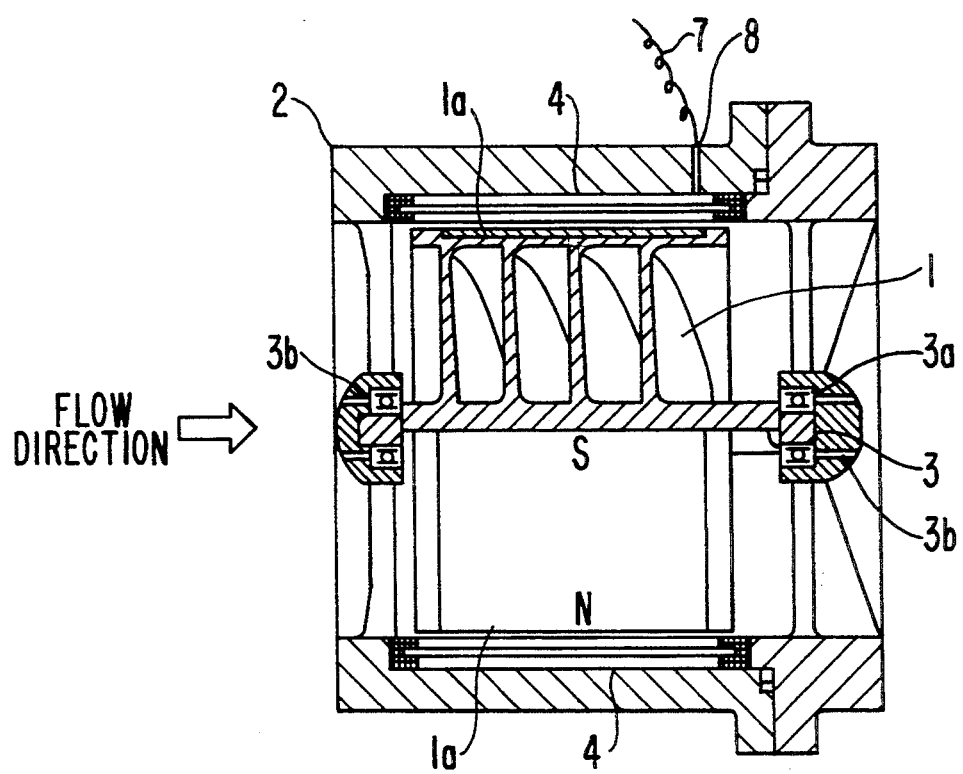
FIG. 6 shows a fifth preferred embodiment of a motor-driven pump according to the present invention, FIG. 6(a) being a general cross-sectional view thereof, and FIG. 6(b) being a cross-sectional view of a portion thereof showing the relative position of a casing and an impeller.
Figure 6B:
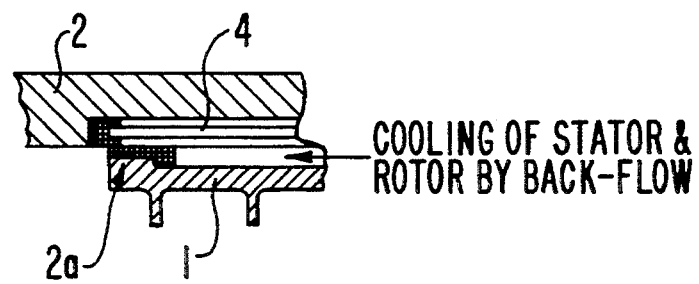

Alternatively, the driving electromagnet 4 could be mounted to the inside of the casing 2 as in the fifth preferred embodiment shown in FIG. 6. This preferred embodiment is suitable for the case in which an even greater torque is required as compared to the motor-driven pump shown in FIG. 4.

Figure 7A:
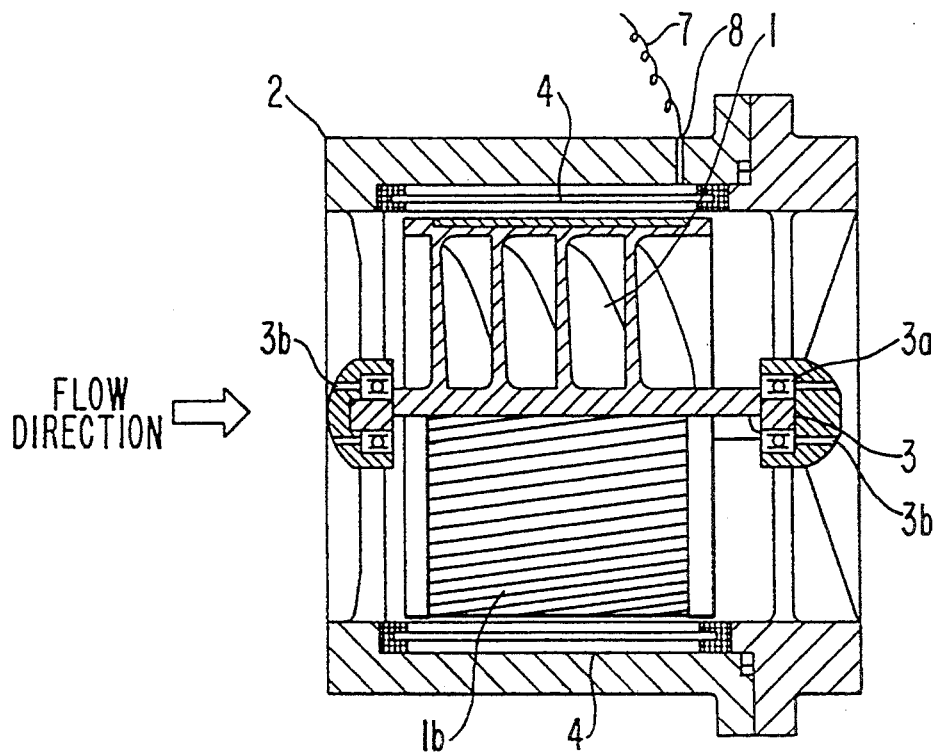
FIG. 7 is a cross-sectional view of a sixth preferred embodiment of a motor-driven pump according to the present invention, and FIG. 7(a) being a general cross-sectional view thereof, FIG. 7(b) being a cross-sectional view of a bearing portion thereof, and FIG. 7(c) being a cross-sectional view of a portion thereof showing the relative position of a casing and an impeller.
Figure 7B:
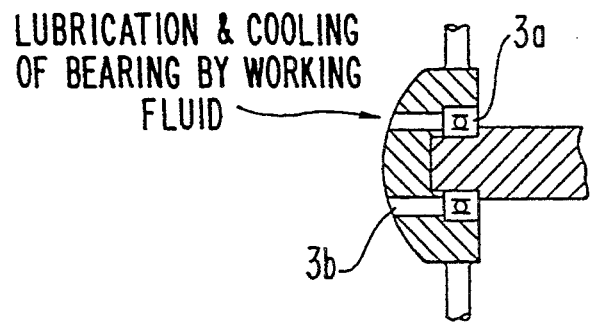
Figure 7C:
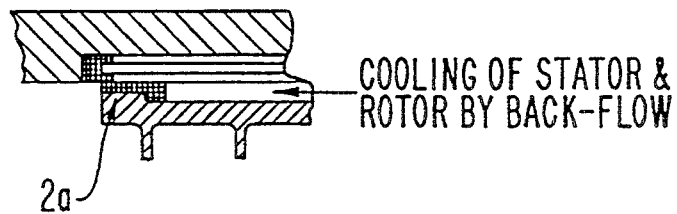

Next, in the sixth preferred embodiment shown in FIG. 7, which is similar to the embodiment shown in FIG. 6, a rotor 1b of an induction motor is mounted to the outer circumference of an impeller 1 of the pump so as to be integrated with the impeller 1, and the rotor 1b and impeller 1 are assembled together with a bearing 3a and a rotary shaft 3 within a casing 2.

This rotor 1b is typically formed by fixedly securing wire material made of conductor to the impeller 1 by means of adhesive. In the case where very-low-temperature liquid is employed as working fluid, in order to prevent peeling, it is desirable to use epoxy resin adhesive such as ARALDITE XD580 (trade name) made by Ciba Geigy Corp. or United States Specification MMM-A-132, Type-1, Class 3 adhesive.

An electromagnet 4 serving as a stator is mounted within the casing 2 as opposed to the rotor 1b. Similar to the embodiment shown in FIG. 6, lead wires 7 for the electromagnet 4 are lead out through the casing 2. By sealing this penetrating portion 8, the inner space through which the working fluid flows is isolated from the outside of the casing 2.

Since the remaining structure is similar to that of the motor-driven pump according to the fifth preferred embodiment shown in FIG. 6, a description thereof will be omitted. It is to be noted that even if the electromagnet 4 should contact the very-low-temperature fluid such as liquid hydrogen, liquid helium and liquid oxygen, no problems would arise if the following coil were employed. That is, normal enamel-coated wire material is used to form a coil and it is solidified by adhesive for very-low-temperature use. In addition, the elementary coil wire or the entire coil is coated with an oxide film and then solidified by means of adhesive for very-low-temperature use.

It is to be noted that in FIGS. 4 to 7, the pump is constructed in such a manner that liquid oxygen acting as working fluid can be employed as a lubricating and cooling agent, and in order to facilitate the flow of working fluid through the bearings 3a, communication holes 3b constituting part of a flow passageway are provided. In addition, for the purpose of insuring the efficiency of the pump, liquid-tightness of a certain degree is necessary, and to that end an inducer liner ring 2a consisting of a labyrinth is provided on the outer surface of the impeller 1 facing the casing 2. In this case, working fluid will flow through a gap between the impeller 1 and the casing 2 on the downstream side of the inducer liner ring 2a, and the electromagnet 4 and the magnet 1a are cooled by this working fluid.

Figure 8:
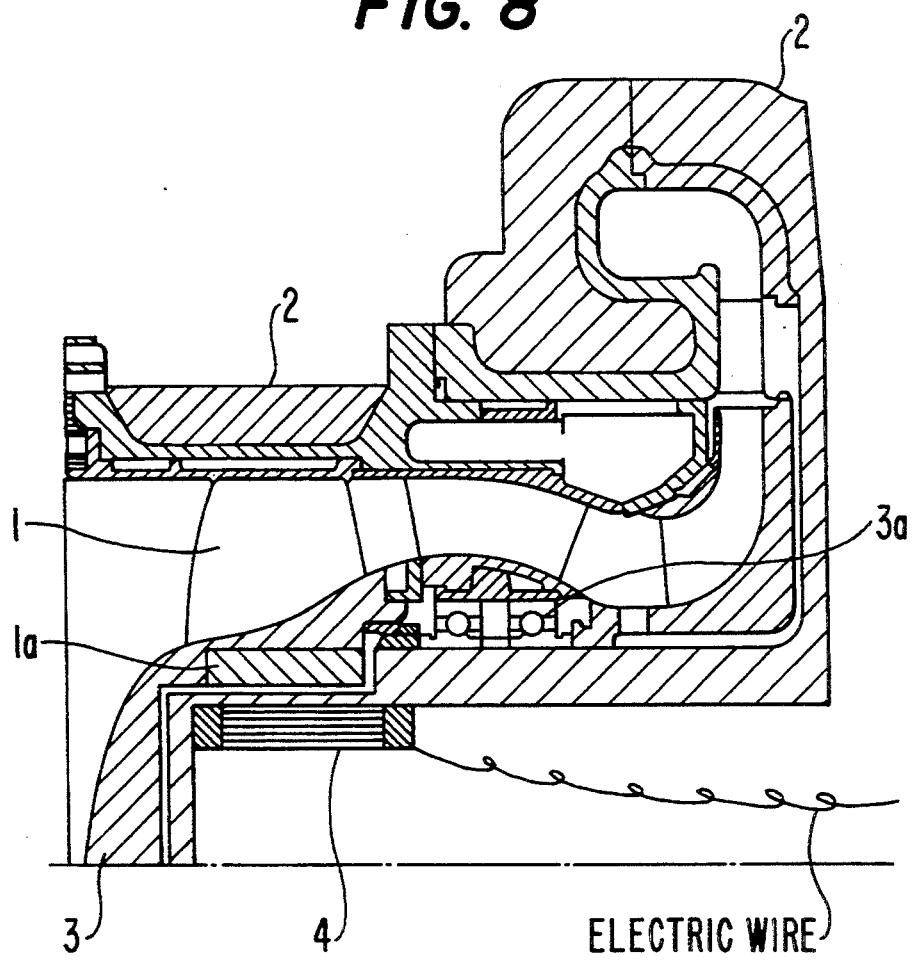
FIG. 8 is a cross-sectional view of a seventh preferred embodiment of a motor-driven pump according to the present invention.
Figure 9:
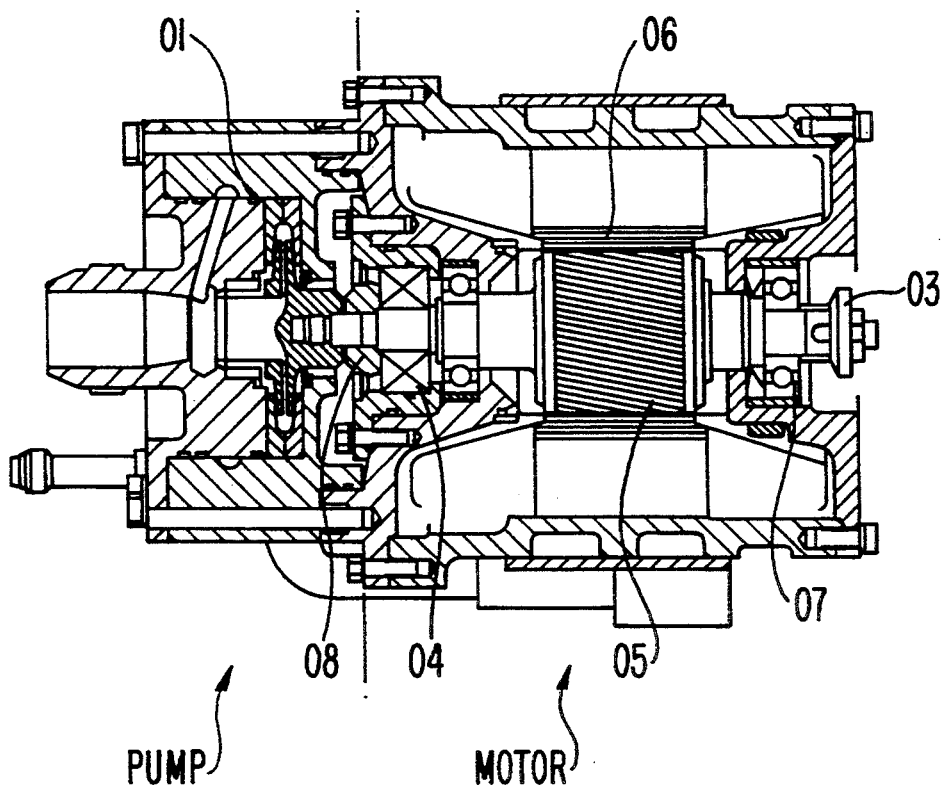
FIG. 9 is a cross-sectional view of a motor-driven pump in the prior art.

Furthermore, as seen in the seventh preferred embodiment shown in FIG. 8, the present invention can be applied to a pump having a mixed flow type of impeller 1. In this embodiment, a magnet 1a is embedded within a boss of an impeller to form an outer rotor type of integral impeller, a shaft for supporting the impeller 1 is provided integrally with a casing 2, and a driving electromagnet 4 is mounted within this shaft as opposed to the magnet 1a. This seventh preferred embodiment of a pump is suitable for use where an inlet diameter is large and when a low torque can suffice.

In addition, mounting configurations of the magnets/permanent magnets other than the above-described flat, inner-rotor or outer-rotor, and centrifugal mixed-flow or axial-flow configurations could be employed. For instance, magnets 1a and driving electromagnets 4 could be disposed in a conical configuration.

In these motor-driven pumps, because an electric motor is integrated with the pump, a seal for the shaft is unnecessary, a relatively short rotary shaft can be employed, tolerances of concentricity and dimensions associated with the rotary shaft 3, casing 2 and bearings 3a are not severe, and a special adjusting jig for shaft-sealing is not necessary. In addition, since there is no location where there is relative sliding of a shaft to a seal, there will be no leaking of combustible fluid such as hydrazines, hydrogen or the like even in the case where the pump is used in a vacuum such as in a space station. Also, a purge operation which is necessary for a shaft seal especially in the case of very-low-temperature combustible fluid, is eliminated. Moreover, because the rotary shaft is relatively short, vibrations caused by eccentricity can be suppressed. Also, in the case where the pump is used in a vacuum, it is unnecessary to cool the electric motor. In addition, the weight of the motor-driven pump can be about 50–70% of that of the heretofore known pump. Further, due to the non-existence of a seal for the rotary shaft, mechanical loss is mitigated, abrasion does not occur, and hence the useful life of the pump is enhanced. Moreover, if the working fluid is very-low-temperature liquid, a superconducting coil cooled by the fluid can be used as the stator, whereby the pump will exhibit high efficiency. Also, the inside and the outside of the pump can be isolated perfectly with respect to fluid by the casing 2. In addition, the subject pump can be used in a vacuum, into which environment fluid should never be allowed to leak. Accordingly, besides being used as a booster of liquid fuel in a rocket, the subject pump can be used for transporting or recirculating very-low-temperature liquid such as liquid oxygen, liquid hydrogen, liquid nitrogen, liquid helium or the like, for transporting non-magnetic fluid, for stirring liquid within a zero gravity tank, and for conveying combustible fluid such as hydrazines in a ground installation or in a cosmic space station.

While a principle of the present invention has been described above in connection with a number of preferred embodiments of the invention, it is intended that all matter contained in the above description and illustrated in the accompanying drawings be interpreted as illustrative of the invention and not in a limiting sense.

What is claimed is:

1. A motor-driven pump comprising: a casing defining an inlet of the pump, an outlet of the pump, and a main passageway communicating with both the inlet and the outlet; an impeller disposed within said casing in said main passageway; a rotary bearing rotatably supporting said impeller, said bearing including a series of rolling members; a permanent magnet fixed to said impeller; an electromagnet fixed to said casing; and a flow passageway open in the pump to said main passageway and to opposite sides of said series of rolling members such that fluid from said main passageway will freely pass through said flow passageway and over the rotary bearing at both sides of the series of rolling members thereof.

2. A motor-driven pump as claimed in claim 1, wherein said bearing is a ball bearing and said rolling members are balls.

3. A motor-driven pump as claimed in claim 2, and further comprising a rotary shaft integral with said impeller so as to rotate therewith, said rotary bearing having an inner race fixed to said shaft and an outer race fixed to said casing.

4. A motor-driven pump as claimed in claim 1, wherein said bearing includes a retainer of a self-lubricating material retaining said rolling members in a spaced apart relation.

5. A motor-driven pump as claimed in claim 4, and further comprising a rotary shaft integral with said impeller so as to rotate therewith, said rotary bearing having an inner race fixed to said shaft and an outer race fixed to said casing.

6. A motor-driven pump as claimed in claim 1, and further comprising an inducer lining ring disposed on an outer circumferential portion of said impeller, said lining ring occupying a gap between the outer circumferential portion of said impeller and said casing, and an iron core around which said electromagnet extends.

7. A motor-driven pump as claimed in claim 1, and further comprising a rotary shaft integral with said impeller so as to rotate therewith, said rotary bearing having an inner race fixed to said shaft and an outer race fixed to said casing.

8. A motor-driven pump comprising: a casing defining an inlet of the pump, an outlet of the pump, and a main passageway communicating with both the inlet and the outlet; an impeller disposed within said casing in said main passageway; a rotary bearing rotatably supporting said impeller, said bearing including a series of rolling members; an induction coil fixed to said impeller; an electromagnet fixed to said casing; and a flow passageway open in the pump to said main passageway and to opposite sides of said series of rolling members such that fluid from said main passageway will freely pass through said flow passageway and over the rotary bearing at both sides of the series of rolling members thereof.

9. A motor-driven pump as claimed in claim 8, wherein said bearing is a ball bearing and said rolling members are balls.

10. A motor-driven pump as claimed in claim 9, and further comprising a rotary shaft integral with said impeller so as to rotate therewith, said rotary bearing having an inner race fixed to said shaft and an outer race fixed to said casing.

11. A motor-driven pump as claimed in claim 8, wherein said bearing includes a retainer of a self-lubricating material retaining said rolling members in a spaced apart relation.

12. A motor-driven pump as claimed in claim 11, and further comprising a rotary shaft integral with said impeller so as to rotate therewith, said rotary bearing having an inner race fixed to said shaft and an outer race fixed to said casing.

13. A motor-driven pump as claimed in claim 8, and further comprising an inducer lining ring disposed on an outer circumferential portion of said impeller, said lining ring occupying a gap between the outer circumferential portion of said impeller and said casing, and an iron core around which said electromagnet extends.

14. A motor-driven pump as claimed in claim 8, and further comprising a rotary shaft integral with said impeller so as to rotate therewith, said rotary bearing having an inner race fixed to said shaft and an outer race fixed to said casing.

* * * * *